United States Patent
Belyy et al.

(10) Patent No.: US 10,089,371 B2
(45) Date of Patent: Oct. 2, 2018

(54) EXTENSIBLE EXTRACT, TRANSFORM AND LOAD (ETL) FRAMEWORK

(71) Applicant: SAP SE, Walldorf (DE)

(72) Inventors: Andrey Belyy, Sunnyvale, CA (US); Ajit Dash, Cupertino, CA (US)

(73) Assignee: SAP SE, Walldorf (DE)

( * ) Notice: Subject to any disclaimer, the term of this patent is extended or adjusted under 35 U.S.C. 154(b) by 498 days.

(21) Appl. No.: 14/983,467

(22) Filed: Dec. 29, 2015

(65) Prior Publication Data
US 2017/0185661 A1    Jun. 29, 2017

(51) Int. Cl.
G06F 17/30    (2006.01)
H04L 29/08    (2006.01)

(52) U.S. Cl.
CPC .. G06F 17/30563 (2013.01); G06F 17/30076 (2013.01); G06F 17/30079 (2013.01); H04L 67/06 (2013.01); H05K 999/99 (2013.01)

(58) Field of Classification Search
CPC ................................................ G06F 17/30563
See application file for complete search history.

(56) References Cited

U.S. PATENT DOCUMENTS

| | | | | |
|---|---|---|---|---|
| 8,601,220 B1* | 12/2013 | Corbin | ................. | G06F 3/0617 711/111 |
| 8,812,566 B2* | 8/2014 | Aizman | ............ | G06F 17/30233 707/827 |
| 9,213,721 B1* | 12/2015 | Faibish | ............. | G06F 17/30221 |
| 9,805,103 B2* | 10/2017 | Lingamneni | ...... | G06F 17/30563 |
| 2005/0049996 A1* | 3/2005 | Srinivasan | ........ | G06F 17/30917 |
| 2007/0112802 A1* | 5/2007 | Volanen | ................... | G06F 19/28 |
| 2008/0133455 A1* | 6/2008 | Giordano | .......... | G06F 17/30563 |
| 2008/0172423 A1* | 7/2008 | Shinkai | ................. | G06F 3/0605 |
| 2008/0235300 A1* | 9/2008 | Nemoto | ............ | G06F 17/30079 |
| 2009/0006500 A1* | 1/2009 | Shiozawa | ............ | G06F 11/1662 |
| 2009/0037514 A1* | 2/2009 | Lankford | ................ | H04L 45/00 709/201 |
| 2014/0006465 A1* | 1/2014 | Davis | ................. | G06F 17/30194 707/827 |
| 2016/0041996 A1* | 2/2016 | Prinz, III | .......... | G06F 17/30079 707/827 |

* cited by examiner

*Primary Examiner* — William Spieler
(74) *Attorney, Agent, or Firm* — Klarquist Sparkman, LLP

(57) ABSTRACT

Described herein is an extensible extract, transform and load (ETL) framework. In accordance with one aspect of the framework, a file location object and a corresponding file format object are retrieved from a repository. The file location object stores file location parameters that specify a remote file system directory and a local file system directory, while the file format object stores location configuration parameters that specify a data file and the file location object. The data file may be transferred from the remote file system directory to the local file system directory according to the file location parameters and the location configuration parameters. An extract, transform and load (ETL) job may then be performed on the data file to generate an output file.

20 Claims, 13 Drawing Sheets

Configurations for File Location 4B Reports

Configurations: 4 — 306

| | local | remote_ftp | secure_ftp | secure_ftp | secure_copy |
|---|---|---|---|---|---|
| Connection | | 302a | 302b | 302c | 302d |
| Default configuration | Yes | No | No | No | No |
| Protocol — 308 | local | ftp | sftp | sftp | scp |
| Host — 310 | N/A | pald0089783a.amer.global.corp.sap | pald0087683a.amer.global.corp.sap | pald0087683a.amer.global.corp.sap | pald0087683a.amer.global.corp.sap |
| Port — 312 | N/A | 6500 | <default> | 3082 | 3082 |
| Authorization Type | N/A | N/A | ******** | ******** | Public key |
| User | N/A | N/A | Password | admin | admin |
| Password | N/A | N/A | ******** | ******** | N/A |
| SSH Authorization Private Key File Path — 313 | N/A | N/A | N/A | N/A | C:\Users\818435\AppData\Local\SAP\Data Services\work |
| SSH Authorization Private Key Passphrase — 314 | N/A | N/A | N/A | N/A | ******** |
| SSH Authorization Public Key File Path — 316 | N/A | N/A | N/A | N/A | C:\Users\818435\AppData\Local\SAP\Data Services\work |
| Connection Retry Count — 318 | N/A | 10 | 10 | 10 | 10 |
| Connection Retry Interval — 320 | N/A | 10 | 10 | 10 | 10 |
| File System | | | | | |
| Remote Directory | N/A | /home/data/ | /home/data/2015/ | /home/data/current | /home/data/current |
| Local Directory | c:\data\report.csv | report.dat | q1.dat | *.dat | *.dat |

EXTENSIBLE EXTRACT, TRANSFORM AND LOAD (ETL) FRAMEWORK

TECHNICAL FIELD

The present disclosure relates generally to computer systems, and more specifically, to an extensible extract, transform and load (ETL) framework.

BACKGROUND

Extract, Transform and Load (ETL) generally refers to a process in database usage that extracts data from a source system, transforms the data by storing it in proper format for querying and/or analysis purposes, and loads the data into the final target system. Data integration and transformation software applications (e.g., SAP Data Services) employ ETL tools to enable users to develop and execute workflows that retrieve data from predefined data sources (e.g., applications, Web services, flat-files, databases, etc.), transform that data, and then output the results back to the same or different data sources (i.e., target).

While using an ETL tool to extract or load data files, a user typically associates location parameters of the data files to file format objects. Whenever there is a change in file location parameters, however, the user needs to find and modify all the file format objects that are affected. This is potentially labor-intensive, particularly if there is a large number of file formats with the same data file locations (e.g., one common directory C:\DataFile\).

Another challenge may be posed by the different file directory syntaxes imposed by different operation systems. For example, the UNIX file directory syntax (e.g., /usr/User1/datafile) is different from WINDOWS file directory syntax (e.g., c:\Users\User1/datafile). If users want to process data files for the same file format, but in different operation systems, they need to create duplicate file format objects for the different operating systems (e.g., one for WINDOWS system and another for UNIX system).

Yet another challenge relates to the use of variables in specifying file locations and/or names. When users design a file format in an ETL dataflow, they may not know the exact file location and file name. In such case, they typically define file location parameters as variables, which are defined or filled during runtime of the ETL job. If the ETL job is published as a Web service, the end user is allowed to substitute the variables with, for example, a name of an unauthorized location of a system and extract or corrupt the file.

A further challenge relates to the configuration of file location parameters for remote systems or directories. When an ETL developer designs a file format to extract or load data files, he or she may not know at that time if the data file location is at a remote system or a local system. If the file location is at a remote system, the ETL developer typically does not know which file access protocol (e.g., file access protocol or FTP, secure file access protocol or SFTP, secure copy protocol or SCP, FTP over secure sockets layer or FTPS, etc.) will be available in the remote system to access the file.

When an ETL job is deployed to a production system, the job may access a remote system using a secure file access protocol to download or upload files for ETL processing. Suppose the secure file access protocol daemon (e.g., SFTP daemon for SFTP protocol) is down due to some technical reason in the remote system. In this scenario, when the ETL job runs, it will fail as it cannot access the remote file. The ETL administrator may intervene to provide a temporary solution by manually copying files from the remote system to a local system by some other means (e.g., access through a shared file mount). In order to run the job while the remote server file access daemon is down, the ETL administrator also needs to change the ETL job definition to disable access of the file from the remote system, and instead read the file from the local system. Generally, changing the job definition to accommodate such temporary solution is not an efficient approach. It requires seeking the approval from many stakeholders, which is not an easy process that can be achieved in a timely manner.

SUMMARY

An extensible extract, transform and load (ETL) framework is described herein. In accordance with one aspect of the framework, a file location object and a corresponding file format object are retrieved from a repository. The file location object stores file location parameters that specify a remote file system directory and a local file system directory, while the file format object stores location configuration parameters that specify a data file and the file location object. The data file may be transferred from the remote file system directory to the local file system directory according to the file location parameters and the location configuration parameters. An extract, transform and load (ETL) job may then be performed on the data file to generate an output file.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3 shows an exemplary user interface screen for configuring a file location object;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

An extensible extract, transform and load (ETL) framework is described herein. One aspect of the present framework provides a flexible, extensible and administrable encapsulation mechanism for ETL data flows. In some implementations, a file location data object is used to encapsulate configuration data values for file location parameters associated with the data file to be processed by the ETL job. Exemplary file location parameters include, but are not limited to, file access protocol type, file access authentication type, remote directory where the file is located, and local directory where the file will be processed by an ETL job.

By encapsulating configuration data for file location parameters in a file location data object, any changes made to the parameter values (e.g., file access protocol, directory, etc.) are automatically propagated to all associated file format objects. The file location object is advantageously extensible to support different file access protocols, such as file transfer protocol (FTP), Secure File access protocol (SFTP), Secure Copy Protocol (SCP), LOCAL, Hadoop File access protocol (HFTP) or FTP over Secure Sockets Layer (FTPS) file access protocols. In addition, multiple configurations are supported for running the ETL job on different landscapes or operating systems. Further, end users are prevented from defining file location parameters with those associated with malicious files by avoiding the use of variables. These and other exemplary features and advantages will be described in more details herein.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
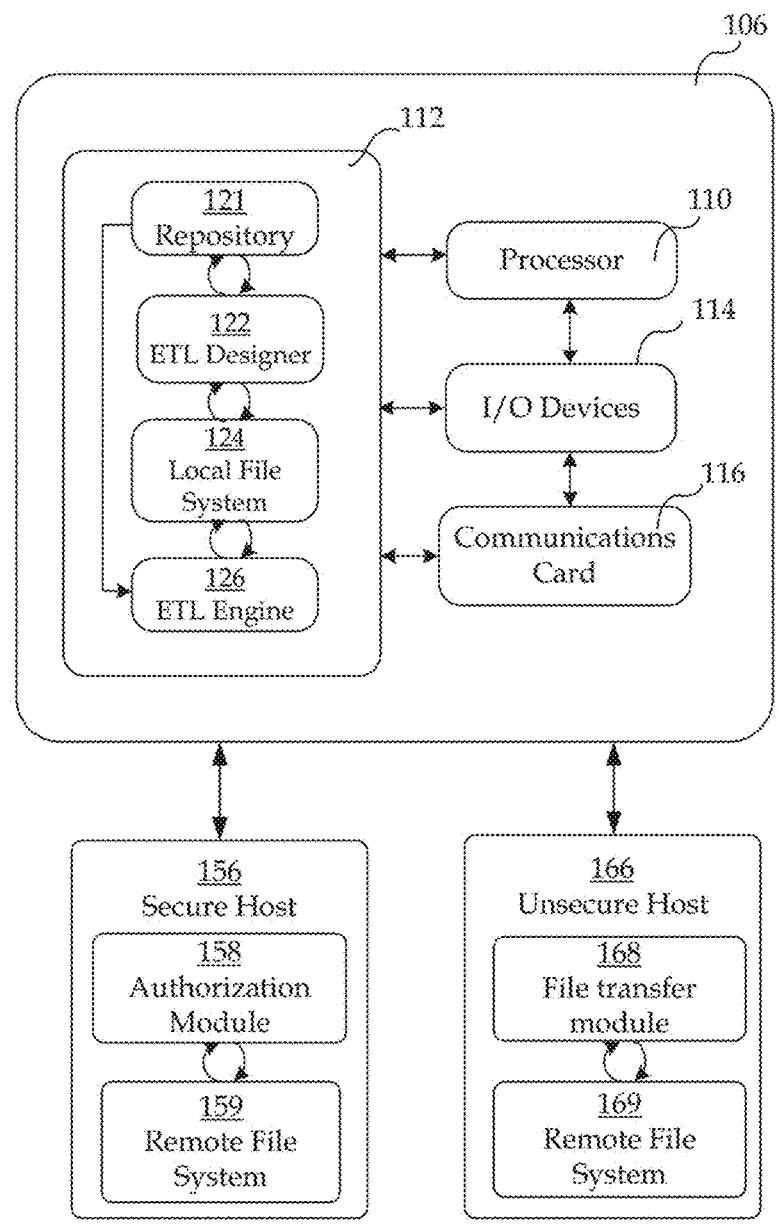
FIG. 1 is a block diagram illustrating an exemplary architecture.

FIG. 1 is a block diagram illustrating an exemplary architecture 100 in accordance with one aspect of the present framework. Generally, exemplary architecture 100 may include a server 106 that is communicatively coupled to a secure host 156 and an unsecure host 166.

Server 106 is a computer system that is capable of responding to and executing machine-readable instructions in a defined manner. Server 106 may include a processor device 110, input/output (I/O) devices 114 (e.g., touch screen, keypad, touch pad, display screen, speaker, etc.), a memory module (or device) 112 and a communications card or device 116 (e.g., modem and/or network adapter) for exchanging data with a network (e.g., local area network or LAN, wide area network (WAN), Internet, etc.). It should be appreciated that the different components and sub-components of server 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, server 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes a repository 121, an ETL designer 122, a local file system 124 and an ETL engine 126. Other components may also be included. Repository 121 may include a defined set of database tables to store its ETL modeling language (e.g., ATL Transformation Language), one or more file format and file location objects, as well as metadata of source and target objects.

ETL designer 122 may be used to model the ETL process or job. ETL designer 122 generates the ETL modeling language, objects and metadata, and stores them in repository 121. ETL engine 126 is a transformation engine that performs the ETL job. ETL engine 126 reads the ETL modeling language, objects and metadata from repository 121, creates runtime objects and executes the ETL job to move data from the source system (e.g., secure host 156 or unsecure host 166) to the target system (e.g., system 106). A job server (not shown) may be used to launch the ETL engine 126 in response to a request to execute the ETL job. The job server may also serve to manage the job's trace log, monitoring log, error log and so forth.

Server 106 may operate in a networked environment using logical connections to secure host 156 and unsecure host 166. Secure host 156 requires authentication of the user (or client) via an authorization procedure before data files can be accessed, while unsecure host 166 does not require such authentication. Secure host 156 and unsecure host 166 each includes a memory device that stores a remote file system (159, 169) for organizing data files and directories. Such data files may be retrieved by the server 106 for ETL processing.

Secure host 156 and unsecure host 166 may include computer components (e.g., processor device, non-transitory memory) similar to server 106. In addition, secure host 156 includes an authorization module 158 (e.g., SSH daemon) that implements an authorization procedure (e.g., password, public key) to ensure that only authorized users are allowed to access the data files stored in remote file system 159. Unsecure host 166 includes a file transfer module 168 (e.g., FTP server) that allows access to the data files stored in remote file system 169 without requiring authorization.

Either secure host 156 or unsecure host 166 may serve as a source system where data files are retrieved from their respective remote file system (159, 169) for ETL processing in server 106. It should be appreciated that data files may also be retrieved locally from local file system 124 for ETL processing. Secure host 156 and unsecure host 166 may be computer systems that manage a database (e.g., structured query language or SQL database, NoSQL database, etc.), provide Web Services, platform or cloud services. Server 106 communicates with secure host 156 using a secure file transfer communication protocol (e.g., SSH), and unsecure host 166 via an unsecure file transfer communication protocols (e.g., FTP). It should be appreciated that more than one (or none) secure host 156 and/or unsecure host 166 may also be provided.

Figure 2:
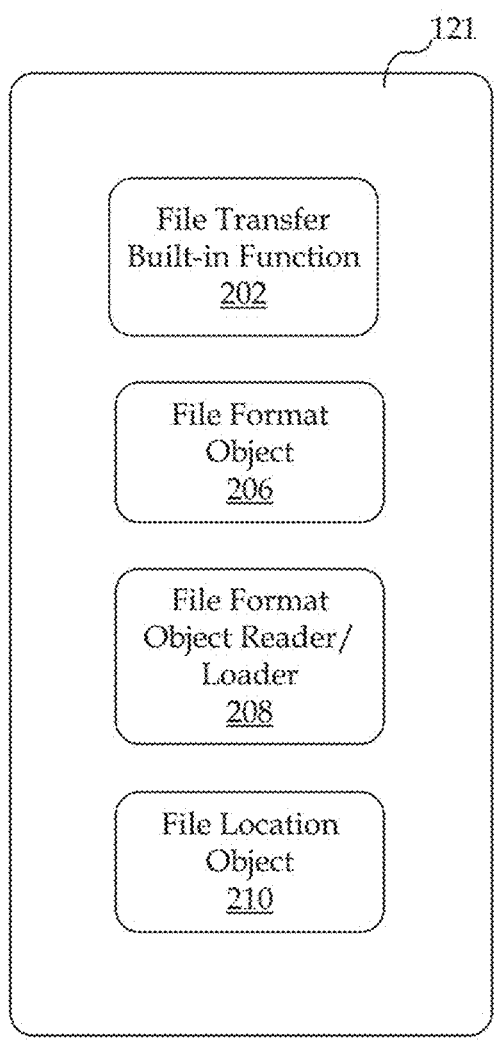
FIG. 2 illustrates an exemplary repository content.

FIG. 2 illustrates an exemplary content of the repository 121. As shown, repository 121 may store one or more file transfer built-in functions 202, one or more file format objects 206, a file format object reader or loader 208, and one or more file location objects 210.

File transfer built-in functions 202 may be used to transfer files to and from the remote systems (e.g., secure host 156 or unsecure host 166). In some implementations, at least two built-in functions (COPY_FROM_REMOTE_SYSTEM and COPY_TO_REMOTE_SYSTEM) are provided.

COPY_FROM_REMOTE_SYSTEM may be used to copy one or more data files from a remote file system to a local file system directory. COPY_TO_REMOTE_SYSTEM may be used to copy one or more files from a local file system to a remote file system directory. Other types of file transfer functions 202 may also be provided. Such functions may be executed only inside a workflow script. These two built-in functions may be used to copy one or more data files to and from a remote system (e.g., secure host 156 or unsecure host 166). The data files exist under a "Remote File System Directory" specified in a file location object 206.

File format object 206 stores metadata that defines the way information is encoded for storage in a computer file (i.e., file format) of the source system (e.g., remote file system 159 or 169). Exemplary file formats defined by the file format object 206 may include, but are not limited to, JavaScript Object Notation (JSON) format, Extensible Markup Language (XML) format, Document Type Definition (DTD) format, common business-oriented language (COBOL) Copybooks format and Excel format. Other types of file formats may also be supported.

File format object loader (or reader) 208 serves to enable the file location object and invoke the ETL engine 126 access the data file in the "remote file system directory" and "local file system directory" parameters specified in the file location object 210 for ETL processing.

File location object 210 stores file location parameters for one or more configurations. FIG. 3 shows an exemplary user interface screen 300 generated by ETL designer 122 for configuring the file location object 210. The file location object is administrable to support multiple different configurations 302a-d. More particularly, the user may define various configurations 302a-d to run the ETL job in many different landscapes.

Each configuration includes a separate set of file location parameters 304. In some implementations, the file location parameters 304 include a file access protocol type 308, file access authentication type 312, remote file system directory 318 and local file system directory 320. Other types of parameters, such as whether default configuration is to be applied 306, remote host information 310 (e.g., host identifier, port, hostkey fingerprint), authentication data 313 (e.g., user name, password, SSH authorization private key file path, private key passphrase and public key file path), connection retry count 314 and connection retry interval 316, may also be configured by the user.

The remote file system directory 318 and local file system directory 320 parameters define the paths of the remote (or source) and local (or target) file system directories. The remote file system directory 318 may be located in a remote file system host (e.g. secure host 156 or unsecure host 166) where the data file is located, while the local file system directory 320 is located in a local file system host (e.g., server 106) where the data file is processed by the ETL job. If the remote file system directory field 320 is left empty, the user home directory may be assumed to be in the remote file server host. If the local file system directory field 318 is left empty, the local file system directory may be assumed to be a predefined default directory at the job server host (e.g., %DS_COMMON_DIR %/workspace).

In some implementations, the fields for remote file system directory and local file system directory do not accept global variables or substitution parameters (i.e., parameters are defined by non-variable values). The reason behind not supporting global variable or substitution parameters is to prevent external user from modifying the directory path option in order to gain access or modify (possibly maliciously) data files outside these directories. Only an authorized ETL user (e.g., system administrator) can configure such parameters. Advantageously, the end user who executes the ETL job cannot access unauthorized file directories in the system. The ETL job can only access, read and write any data files specified by the remote file system directory 318 and local file system directory 320 parameters. Access permission of the file system directories may be defined by, for example, the system administrator or any other authorized user.

The remote file system directory 318 and local file system directory 320 parameters may further serve to control access to the remote and local file systems. Such parameters may include a code (e.g., octal code) that indicates the file access permission mode that is set by the user. For example, the file access permission mode may be set to "755" in the local file system directory property. The first digit in file access permission mode may specify the owner's file access permission, the second digit may specify the "group" file access permission, and the third digit may specify the "other" file access permission.

File access protocol type 308 defines the type of communication protocol for communicating with the source system where the data file is located, such as file transfer protocol (FTP), Secure File access protocol (SFTP), Secure Copy Protocol (SCP), LOCAL, Hadoop File access protocol (HFTP), or FTP over Secure Sockets Layer (FTPS) file access protocols. If the data file is located in a remote system (e.g., secure host 156 or unsecure host 166), the user may define the file access protocol type 308 as, for example, FTP, SFTP or SCP. If the data file is located in system where the ETL job processed, then the file access protocol type 308 may be set to "LOCAL".

The information in file access authentication type 312 depends on the file access protocol type 308 configuration in the remote system. For example, if a secure file access protocol type 308 is specified, a password or public key authorization may be specified. The associated authorization data 313 may further be provided to enable access to the data file in the source system (e.g., secure host 156). Such information is not applicable to a non-secure file access protocol type 308.

The connection retry count 314 and interval between connection retries 316 are used to manage connection retries when the remote server connections drop or the remote server is not available. These parameters may be set by the user or set to a default value (e.g., 10). During connection retries to the remote file server, loader 208 may keep track of the files that are already transferred into memory and avoid recopying them.

Figure 4:
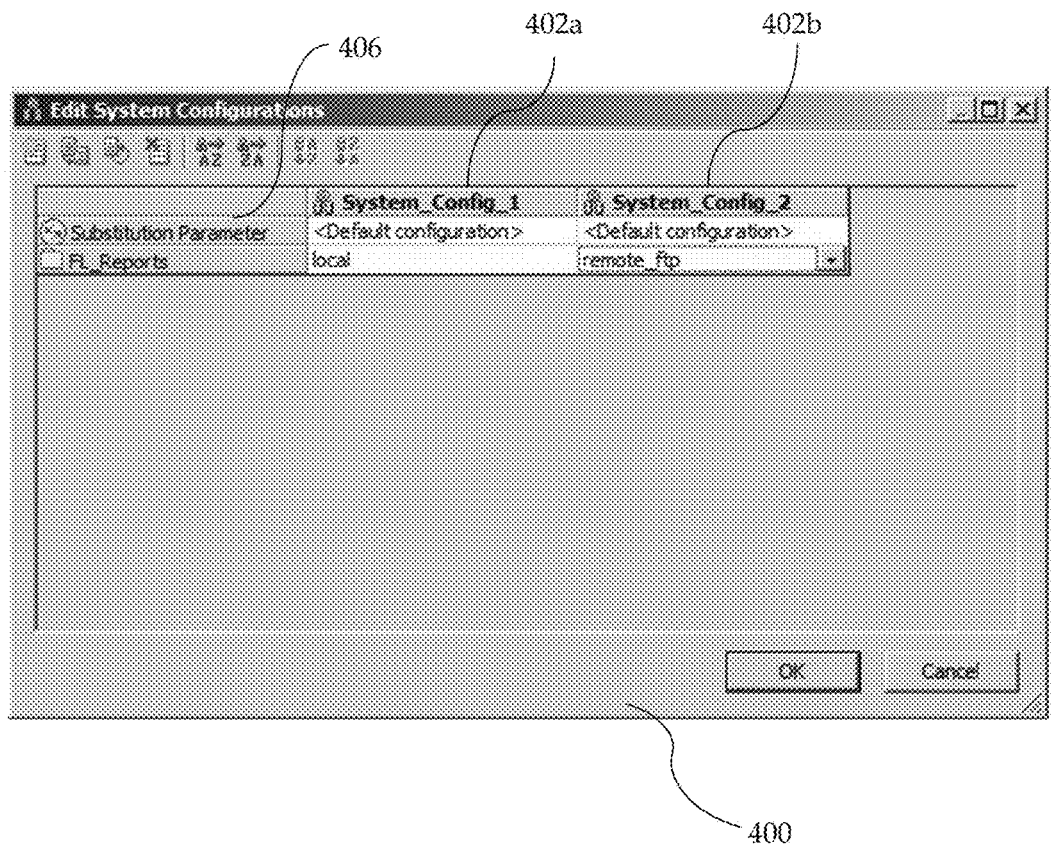
FIG. 4 shows an exemplary user interface screen for associating a particular file location object configuration to a system configuration.

FIG. 4 shows an exemplary user interface screen 400 generated by ETL designer 122 for associating a particular file location object configuration 406 to a system configuration 402a-b. Each system configuration 402a-b defines a set of configurations of at least one file location object that may be used together when running an ETL job. A system configuration may be defined if repository 121 contains at least one file location object with multiple configurations. Substitution parameter configurations may also be associated with a system configuration.

Figure 5:
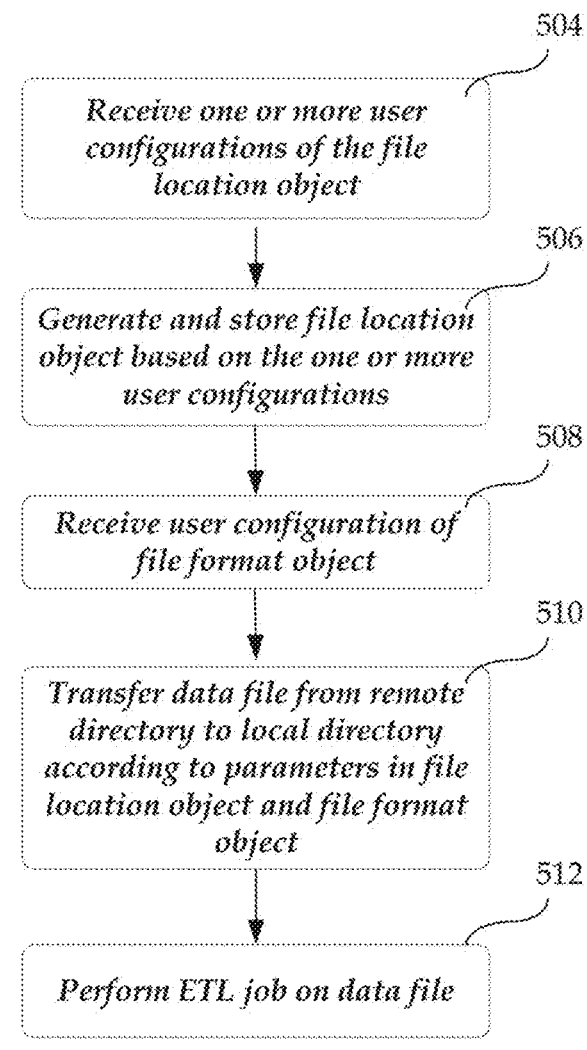
FIG. 5 shows an exemplary method.

FIG. 5 shows an exemplary method 500. The method 500 may be performed automatically or semi-automatically by system 100, as previously described with reference to FIGS. 1 and 2. It should be noted that in the following discussion, reference will be made, using like numerals, to the features described in FIGS. 1 and 2.

At 504, ETL designer 122 receives one or more user configurations of the file location object 210. As discussed previously, the user may define multiple configurations of the file location object 210 to run the ETL job on different landscapes with different, for example, operating systems and/or file access protocols. For example, the user may add one configuration for "FTP file access protocol-WINDOW system" and another configuration for "SFTP file access protocol-UNIX system". During deployment time, the ETL administrator may choose the appropriate configuration that is suitable for a particular landscape and configure the appropriate file location parameters.

Figure 6:
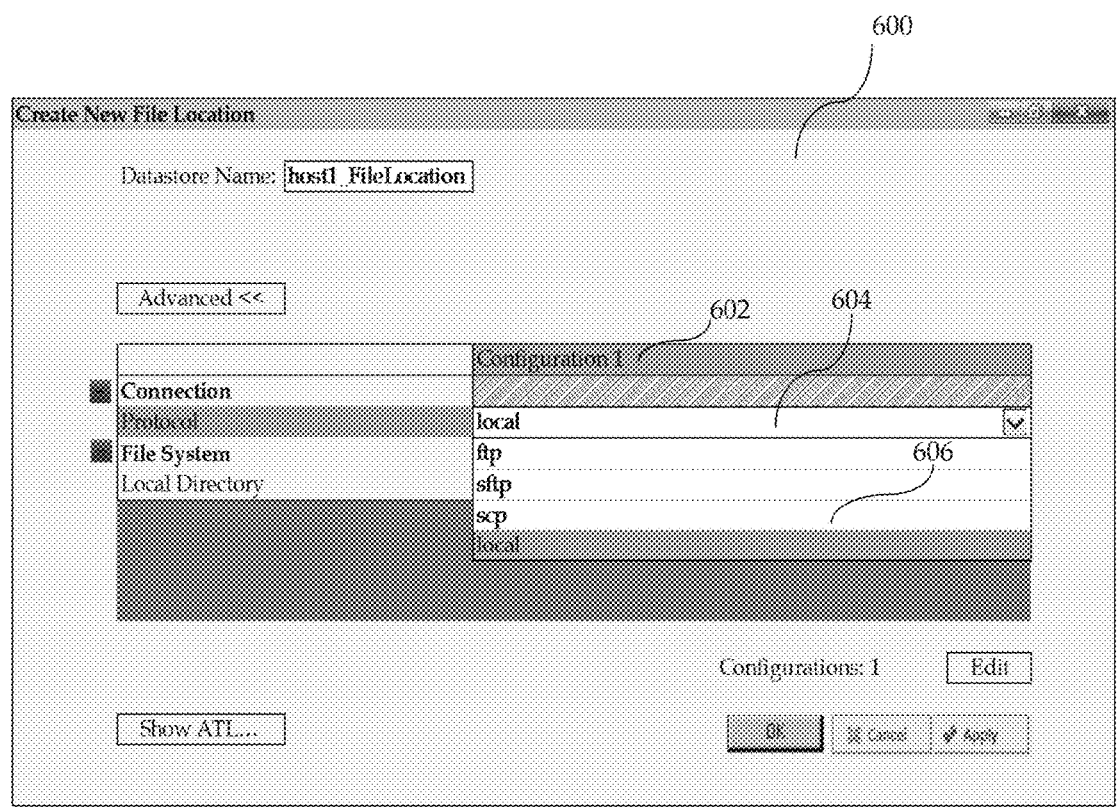
FIGS. 6, 7 and 8 illustrate an exemplary sequence of user interface screens.
Figure 7:
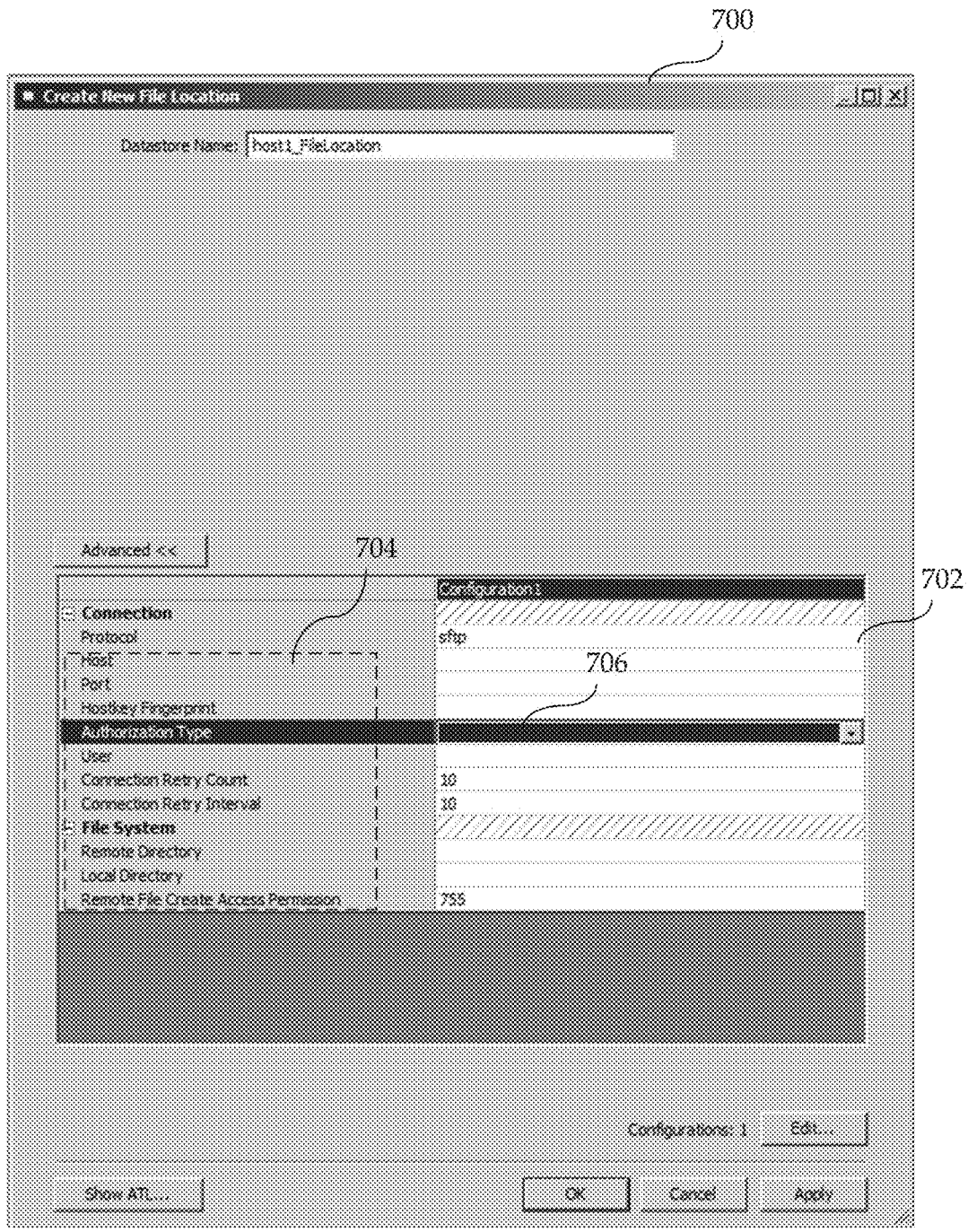
Figure 8:
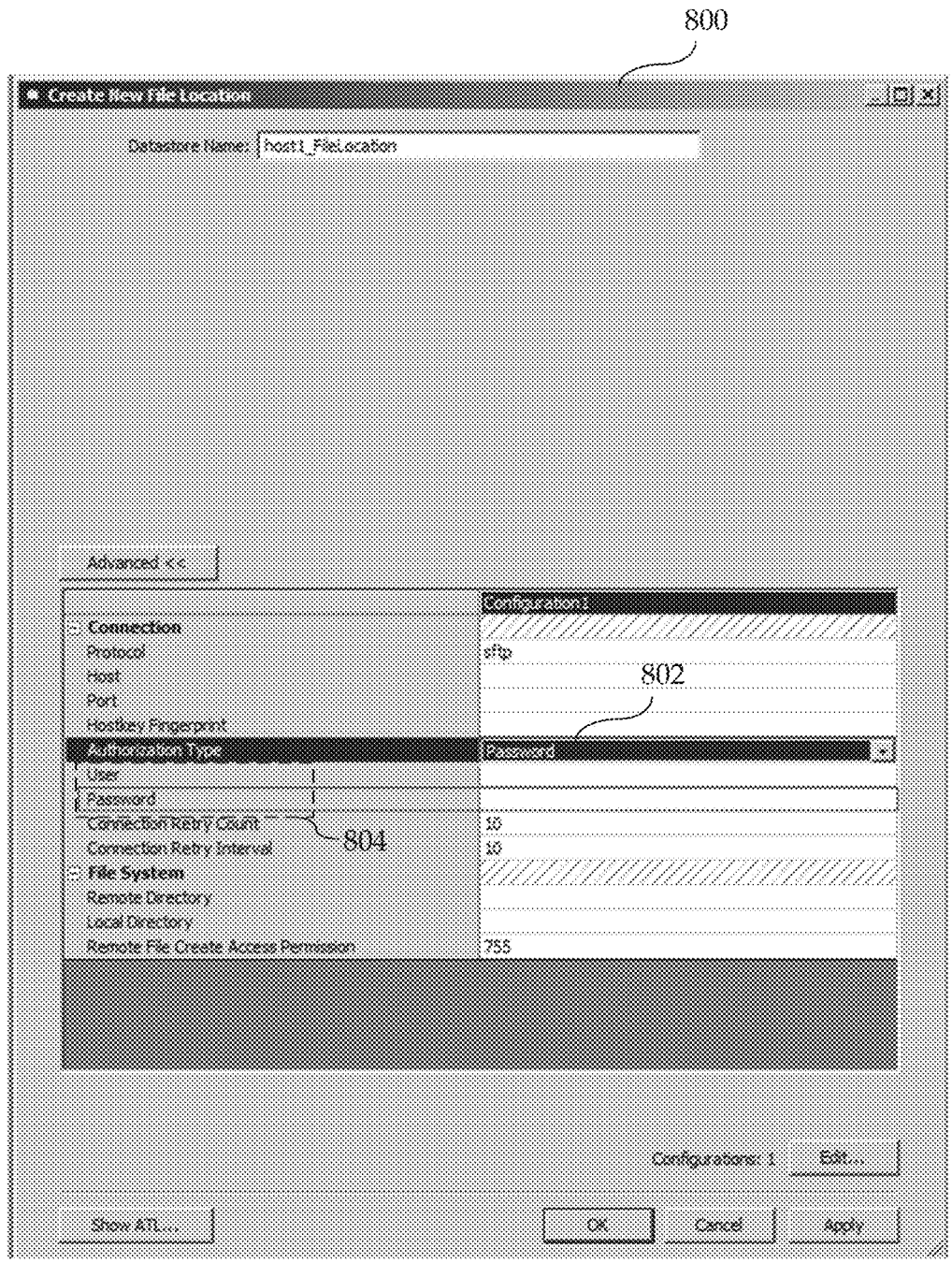

The one or more user configurations may be received via a predetermined sequence of user interface screens generated by the ETL designer 122. FIGS. 6, 7 and 8 illustrate an exemplary sequence of user interface screens (600, 700, 800) arranged to enable the user to input such user configurations.

Referring to FIG. 6, a user may initiate the creation of a new file location object via user interface screen 600. The user may define a configuration 602 by first selecting the file access protocol 604 for accessing the data file at the remote file system directory. A drop-down list 606 (or any other user interface element) may be displayed to enable the user to select one of the available file access protocols (e.g., LOCAL, FTP, SFTP, SCP, etc.).

Depending on which file access protocol is selected, the user interface screen may be updated to display the relevant parameters that are user configurable. FIG. 7 shows an exemplary user interface screen 700 that is displayed in response to the user selecting SFTP 702 as the file access protocol. A set of file location parameters 704 associated with the SFTP file access protocol is displayed for the user to configure. The user may then select, via pull-down menu 706, the authorization type (e.g., password, public key) that is used to authenticate the user accessing data files at the remote file directory host.

Depending on which authorization type is selected, the user interface screen will be updated to display the relevant parameters that are user configurable. FIG. 8 shows an exemplary user interface screen 800 that is displayed in response to the user selecting password 802 as the authorization type. As shown, the parameters 804 are displayed to enable the user to configure the user name and password. Other parameters may also be displayed, according to the type of authorization selected.

Returning to FIG. 5, at 506, ETL designer 122 generates and stores the file location object 210 in repository 121. The file location object 210 stores the configuration data of the various parameters provided by the user via the user interface screens. The file location object 210 may be retrieved and edited by the user as desired.

Figure 9:
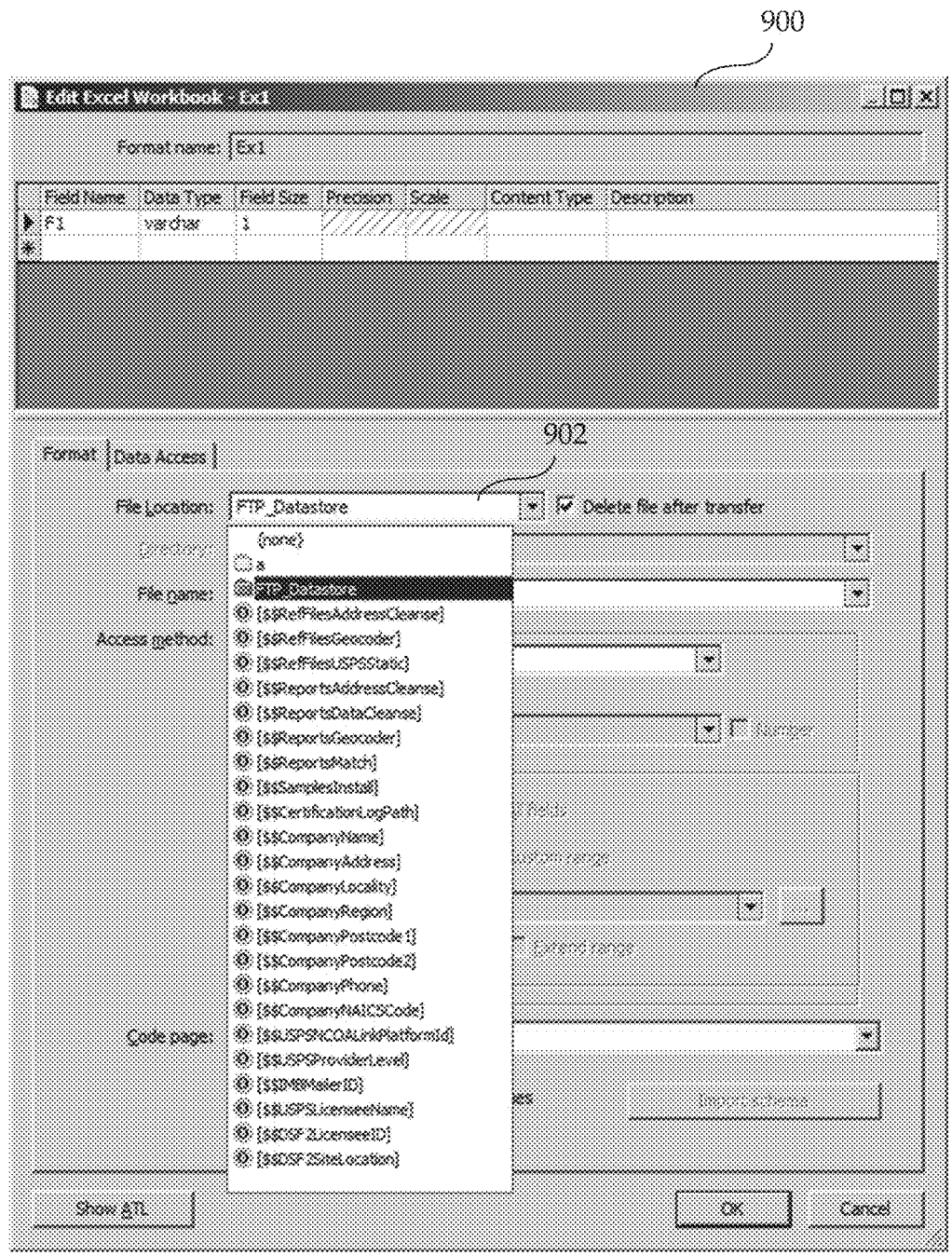
FIG. 9 shows an exemplary user interface screen for configuring a file format object.

At 508, ETL designer 122 receives a user configuration of the file format object 206. FIG. 9 shows an exemplary user interface screen 900 generated by ETL designer 122 to enable a user to configure a file format object 206. A drop down menu 902 may be displayed to list all the file location objects 210 available in the repository 121. The user may select the desired file location object from the drop down menu 902, as shown, to associate it with the file format object 206.

Each file location object 210 may be associated with one or more file format objects 206. In some implementations, each file format object 206 includes a set of location configuration parameters: FL_OBJECT_NAME, FL_FILE_NAME and FL_DELETE_FILE. The FL_OBJECT_NAME parameter specifies the name of the file location object 210 associated with the file format object 206. The FL_FILE_NAME parameter specifies the name of the data file to be transferred, and the FL_DELETE_FILE parameter specifies whether the ETL engine 126 should remove the data file from the "Local File System Directory" and whether Loader 208 should remove the data file after processing or transferring to "Remote File System Directory".

Each file location object 210 may further be associated with a loader (or reader) 208 of the associated file format objects 206. The loader 208 may inherit the values of the location configuration parameters from the respective file format objects 206. The user may also edit these values as desired.

At 510, ETL engine 126 transfers a data file from a remote file system (or source) directory to a local file system (or target) directory according to the file location parameter values stored in the file location object 210 and the location configuration parameter values of the file format object 206. The file location object 210 and corresponding file format object 206 may be retrieved from repository 121. The name of the data file is specified by the FL_FILE_NAME parameter in the file format object 206, while the remote and local file system directory paths are specified by "remote file system directory" and "local file system directory" parameters of the file location object 210. ETL engine 126 may perform the transfer in response to the file format object loader 208 enabling the associated file location object. ETL engine 126 may transfer the data file by accessing it under the directory that is specified in the "remote file system directory" and "local file system directory" parameters of the file location object 210.

In some implementations, ETL engine 126 may transfer the data file from a remote file system directory (159, 169) to a local file system directory (124) before processing for the file access protocols (e.g., FTP, SFTP, SCP) as specified by the file location object. ETL engine 126 may also copy the data file from a local file system directory (124) to a remote file system directory (159, 169) before processing for the file access protocols. For the LOCAL protocol, ETL engine 126 may assume that the data file(s) already exist under the "local file system directory."

At 512, ETL engine 126 performs an ETL job on the data file to generate an output file. The ETL job may involve, for example, consolidating, transforming, analyzing and/or refining (e.g., cleansing or de-duplicating) the data file to generate an output file. The data file may be, for example, transformed to create data warehouses or data marts (e.g., history data). The output file may be transferred to another location or left in the local file system.

To illustrate how a user may use the present framework, three use cases will now be described. In the first use case, the user wants to read data file "abc.xlsx" located in a remote Linux system "HOST1" at "/USR/ajit/SOURCE/EXCEL" directory and the ETL engine is running in a Windows operating system (OS). The user decides to process the data file in directory "C:\temp\source\excel." The user also wants to generate the output data file "xyz.xlsx" at "C:\temp\target\excel" in the ETL engine host (Windows OS) and transfer to remote Linux system HOST1 at "/USR/ajit/TARGET/EXCEL" directory. In addition, the user wants to read the file "abc*.txt" located in remote Linux system HOST1 at the "/USR/ajit/SOURCE/TEXT" directory and the ETL engine is running on a Windows operating system. The user also decides to process the file in "CAtemp\source\text." The user wants to generate the output data file "xyz*.txt" at "CAtemp\target\text" in the ETL engine host (Windows OS) and transfer to a remote Linux system HOST1 at "/USR/ajit/TARGET/TEXT."

Figure 10:
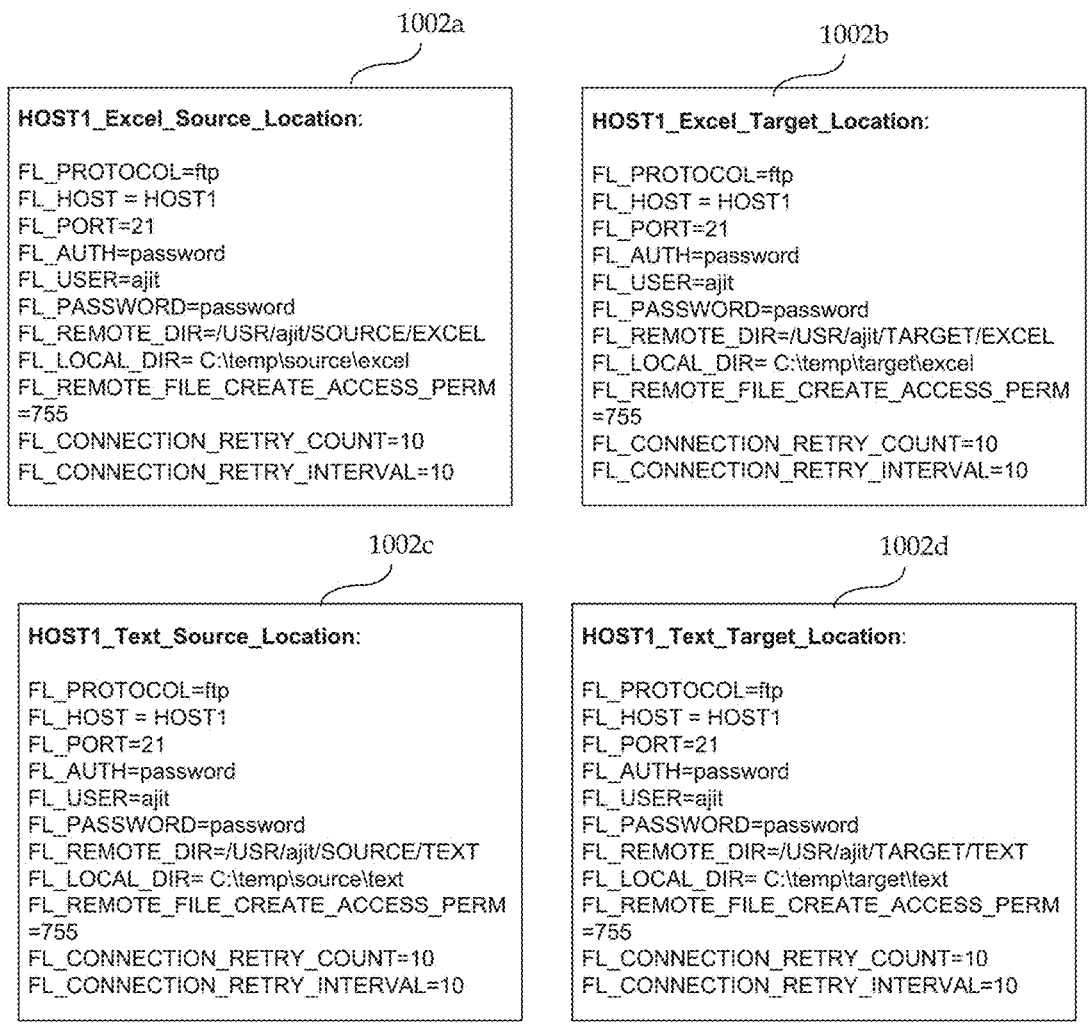
FIG. 10 shows an exemplary configuration data for four file location objects.
Figure 11:
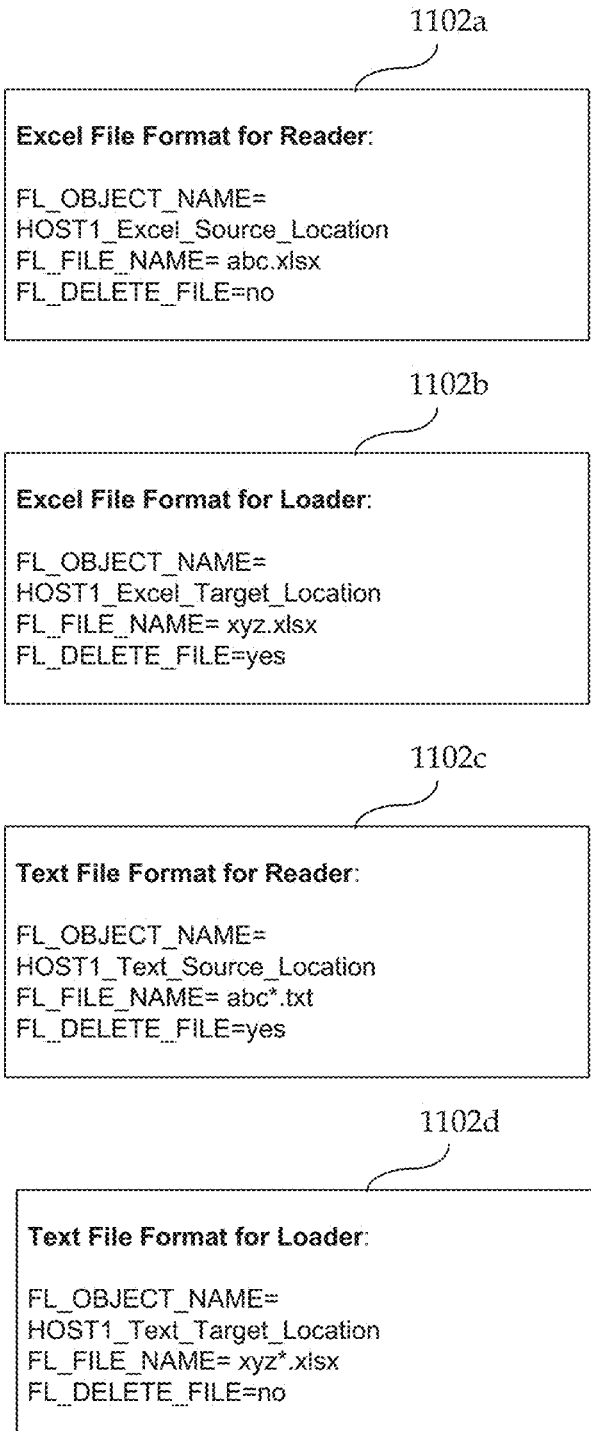
FIG. 11 shows an exemplary configuration data for four file format objects.

To model such design, the user may create four file location objects HOST1_Excel_Source_Location, HOST1_Excel_Target_Location, HOST1_Text_Source_Location and HOST1_Text_Target_Location. FIG. 10 shows the exemplary configuration data 1002a-d for these four file location objects provided by the user via a user interface. FIG. 11 shows the exemplary configuration data 1102a-d for four file format objects associated with these file location objects provided by the user via the user interface.

Figure 12:
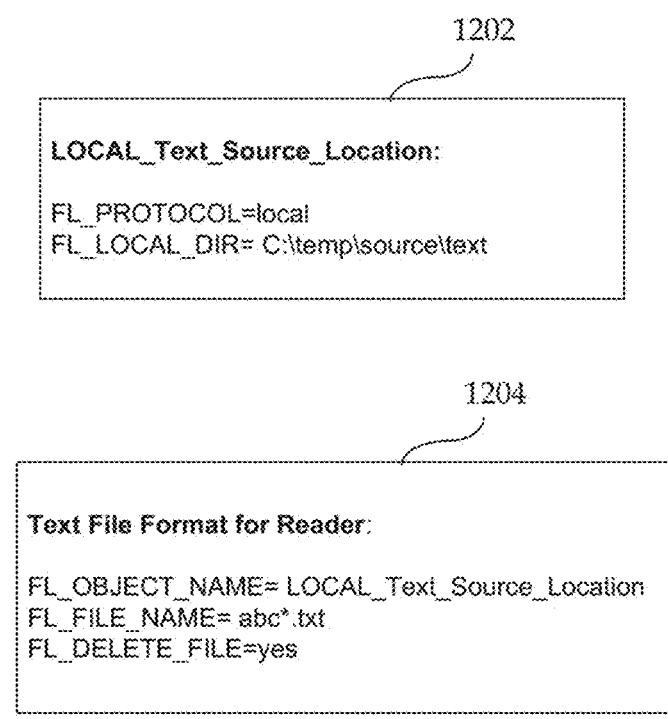
FIG. 12 shows an exemplary configuration data of a file location object and file format object.

In a second use case, the user wants to copy "abc*.txt" file using a script before reading and processing it. The script may be specified as follows:
copy_from_remote_system
("HOST1_Text_Source_Location", "abc*.txt")
The ETL engine extracts the paths of the local directory and remote directory from the "HOST1_Text_Source_Location" file location object. The user may either configure the file format object to use "Local Directory+File Name" as the text source location or create another file location object called "LOCAL_Text_Source_Location." FIG. 12 shows the configuration data 1202 of "LOCAL_Text_Source_Location", and the configuration data 1204 of the file format object corresponding to the file location object. Such configuration data 1202-1204 may be provided by the user via the user interface.

Figure 13:
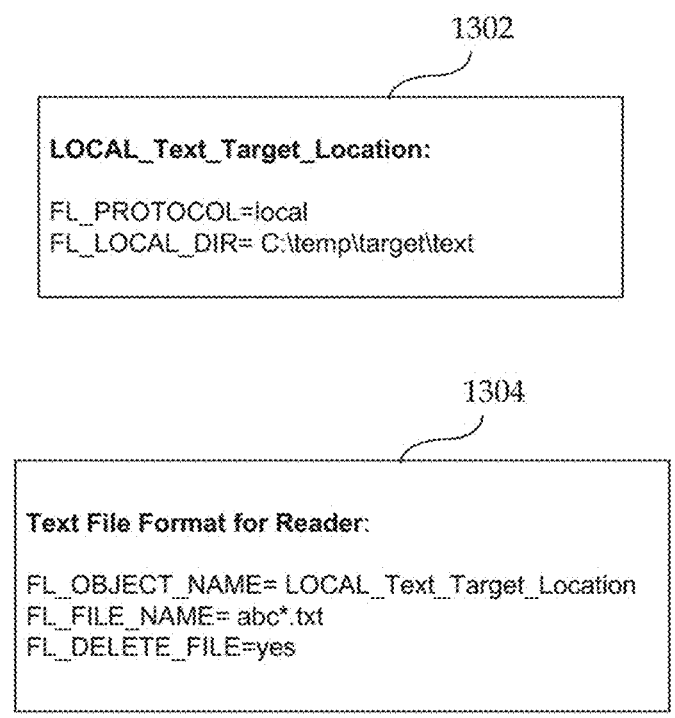
FIG. 13 shows an exemplary configuration data of another file location object and file format object.

In a third use case, the user wants to transfer the "xyz*.txt" file in a script after the file loader generates the files. To accomplish that, the user may either configure the file format object to use "Local Directory+File Name" as the text target location or create another file location object called "LOCAL_Text_Target_Location." FIG. 13 shows the configuration data 1302 of "LOCAL_Text_Target_Location", and the configuration data 1304 of the file format object corresponding to the file location object. Such configuration data 1302-1304 may be provided by the user via the user interface. The script may be specified as follows:
copy_to_remote_system
("HOST1_Text_Target_Location", "xyz*.txt")
The ETL engine extracts the paths of the local directory and remote directory from the "HOST1_Text_Target_Location" file location object.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:
1. A system, comprising:
a remote server including a remote file system directory with at least one data file; and
a local server communicatively coupled to the remote server, including
a non-transitory memory device that stores computer-readable program code, a repository and a local file system directory, and
a processor in communication with the memory device, the processor being operative with the computer-readable program code to
receive, via a user interface, one or more user configurations of a file location object, wherein the file location object stores file location parameters that specify the remote file system directory and the local file system directory,
generate the file location object based on the one or more user configurations and store the file location object in the repository,
retrieve the file location object and a corresponding file format object from the repository, wherein the file format object stores location configuration parameters that specify a data file and the file location object,
transfer the data file from the remote file system directory to the local file system directory by using the file location parameters and the location configuration parameters, and
perform an extract, transform and load (ETL) job on the data file according to parameters in the file format object to generate an output file.
2. The system of claim 1 wherein the remote server comprises a secure host.
3. The system of claim 1 wherein the remote server comprises an unsecure host.
4. The system of claim 1 wherein the file location parameters comprise a file access protocol type.
5. The system of claim 1 wherein the file location parameters comprise a file access authentication type and authentication data.
6. A method, comprising:
retrieving, by a processor device, a file location object and a corresponding file format object from a repository, wherein the file location object stores file location parameters that specify a remote file system directory and a local file system directory, wherein the file format object stores location configuration parameters that specify a data file and the file location object;
transferring, by the processor device, the data file from the remote file system directory to the local file system directory according to the file location parameters and the location configuration parameters; and performing, by the processor device, an extract, transform and load (ETL) job on the data file to generate an output file.

7. The method of claim 6 wherein the file location parameters are defined by non-variable values.

8. The method of claim 6 wherein the file location parameters comprise a file access protocol type.

9. The method of claim 8 wherein the file access protocol type comprises file transfer protocol (FTP), Secure File access protocol (SFTP), Secure Copy Protocol (SCP), LOCAL, Hadoop File access protocol (HFTP), FTP over Secure Sockets Layer (FTPS) file access protocols, or a combination thereof.

10. The method of claim 6 wherein the file location parameters comprise file access authentication type and authentication data.

11. The method of claim 6 wherein the file location parameters comprise connection retry count and connection retry interval.

12. The method of claim 6 further comprises:
   displaying one or more user interface screens arranged to enable a user to input one or more user configurations of the file location object; and
   generating the file location object based on the one or more user configurations and storing the file location object in the repository.

13. The method of claim 12 further comprises receiving multiple user configurations corresponding to different operating systems or different file access protocols.

14. The method of claim 12 wherein displaying the one or more user interface screens comprises displaying a first set of user configurable location parameters in response to a user selection of a file access protocol type.

15. The method of claim 12 wherein displaying the one or more user interface screens comprises displaying a second set of user configurable location parameters in response to a user selection of an authorization type.

16. The method of claim 6 further comprises displaying a user interface screen arranged to enable a user to associate the file format object with the file location object.

17. The method of claim 16 wherein displaying the user interface screen further comprises displaying the user interface screen arranged to further enable the user to configure the file format object.

18. A non-transitory computer-readable medium having stored thereon program code, the program code executable by a computer to perform steps comprising:
   retrieving, by a processor device, a file location object and a corresponding file format object from a repository, wherein the file location object stores file location parameters that specify a remote file system directory and a local file system directory, wherein the file format object stores location configuration parameters that specify a data file and the file location object;
   transferring, by the processor device, the data file from the remote file system directory to the local file system directory according to the file location parameters and the location configuration parameters; and
   performing, by the processor device, an extract, transform and load (ETL) job on the data file to generate an output file.

19. The non-transitory computer-readable medium of claim 18 wherein the file location parameters comprise a file access protocol type.

20. The non-transitory computer-readable medium of claim 18 wherein the file location parameters comprise a file access authentication type and authentication data.

* * * * *